(12) United States Patent
Pudleiner et al.

(10) Patent No.: US 9,726,795 B2
(45) Date of Patent: Aug. 8, 2017

(54) MULTILAYER PLASTIC STRUCTURE HAVING LOW ENERGY TRANSMISSION

(75) Inventors: Heinz Pudleiner, Krefeld (DE); Timo Kuhlmann, Leichlingen (DE); Alexander Meyer, Düsseldorf (DE)

(73) Assignee: Covestro Deutschland AG, Leverkusen (DE)

(*) Notice: Subject to any disclaimer, the term of this patent is extended or adjusted under 35 U.S.C. 154(b) by 234 days.

(21) Appl. No.: 13/878,195

(22) PCT Filed: Oct. 20, 2011

(86) PCT No.: PCT/EP2011/068342
§ 371 (c)(1),
(2), (4) Date: May 29, 2013

(87) PCT Pub. No.: WO2012/055757
PCT Pub. Date: May 3, 2012

(65) Prior Publication Data
US 2013/0242381 A1    Sep. 19, 2013

(30) Foreign Application Priority Data
Oct. 25, 2010  (EP) .................................. 10188778

(51) Int. Cl.
| | |
|---|---|
| *G02B 5/20* | (2006.01) |
| *F21V 9/04* | (2006.01) |
| *F21V 9/06* | (2006.01) |
| *B32B 27/08* | (2006.01) |
| *B32B 27/20* | (2006.01) |
| *B32B 27/30* | (2006.01) |
| *B32B 27/32* | (2006.01) |
| *B32B 27/36* | (2006.01) |
| *B32B 27/40* | (2006.01) |

(52) U.S. Cl.
CPC ............. *G02B 5/208* (2013.01); *B32B 27/08* (2013.01); *B32B 27/20* (2013.01); *B32B 27/308* (2013.01); *B32B 27/325* (2013.01); *B32B 27/36* (2013.01); *B32B 27/365* (2013.01); *B32B 27/40* (2013.01); *B32B 2250/05* (2013.01); *B32B 2250/24* (2013.01); *B32B 2250/42* (2013.01)

(58) Field of Classification Search
CPC ... G02B 5/20; G02B 5/28; G02B 5/22; G02B 7/00; F21V 9/04; F21V 9/06
See application file for complete search history.

(56) References Cited

U.S. PATENT DOCUMENTS

| | | | |
|---|---|---|---|
| 5,239,406 A * | 8/1993 | Lynam .......................... | 359/275 |
| 5,589,280 A | 12/1996 | Gibbons et al. | |
| 5,712,332 A | 1/1998 | Kaieda et al. | |
| 5,770,321 A * | 6/1998 | Hartig ............... | B32B 17/10174 |
| | | | 428/34 |
| 6,049,419 A * | 4/2000 | Wheatley et al. ............ | 359/359 |
| 6,333,084 B1 | 12/2001 | Woodard et al. | |
| 6,780,515 B2 | 8/2004 | Dobler | |
| 7,169,834 B2 * | 1/2007 | Dobler et al. .................. | 524/10 |
| 7,550,193 B2 * | 6/2009 | Hu et al. ....................... | 428/212 |
| 2002/0182389 A1 | 12/2002 | Dobler | |
| 2004/0028920 A1 | 2/2004 | Fujita et al. | |
| 2004/0032658 A1 | 2/2004 | Fleming | |
| 2004/0131845 A1* | 7/2004 | Fujita ....................... | C08K 3/38 |
| | | | 428/328 |
| 2006/0154049 A1 | 7/2006 | Padiyath et al. | |
| 2006/0251996 A1 | 11/2006 | Bogerd et al. | |
| 2008/0075936 A1* | 3/2008 | McGurran ............ | B29C 55/023 |
| | | | 428/212 |
| 2008/0075948 A1 | 3/2008 | Padiyath et al. | |
| 2008/0291541 A1 | 11/2008 | Padiyath et al. | |
| 2008/0292820 A1 | 11/2008 | Padiyath et al. | |

FOREIGN PATENT DOCUMENTS

| | | |
|---|---|---|
| CN | 101265374 A | 9/2008 |
| DE | 10117786 A1 | 10/2002 |
| DE | 10392543 T5 | 4/2005 |
| EP | 1559743 A1 | 8/2005 |
| EP | 1865027 A1 | 12/2007 |
| EP | 2394971 A1 | 12/2011 |
| JP | 6240146 A | 8/1994 |
| JP | 2000234066 A | 8/2000 |
| JP | 2008150548 A | 7/2008 |
| WO | 9936257 A1 | 7/1999 |
| WO | 04000549 A1 | 12/2003 |
| WO | 2005037932 A1 | 4/2005 |
| WO | 2009059901 A2 | 5/2009 |

OTHER PUBLICATIONS

International Search Report for PCT/EP2011/068342 Mailed Jan. 20, 2012.

* cited by examiner

*Primary Examiner* — Scott J Sugarman
*Assistant Examiner* — Balram Parbadia
(74) *Attorney, Agent, or Firm* — Drinker Biddle & Reath LLP

(57) ABSTRACT

A multilayer structure comprising a base layer comprising at least one transparent thermoplastic and a specific inorganic infra-red absorber as well as an IR-reflecting multi-ply layer, the production of such a multilayer structure and the use thereof for the production of glazing made of plastic in buildings, automobiles, rail vehicles and aircraft.

19 Claims, No Drawings

MULTILAYER PLASTIC STRUCTURE HAVING LOW ENERGY TRANSMISSION

CROSS REFERENCE TO RELATED APPLICATIONS

This application is a §371 National Stage Application of PCT/EP2011/068342, filed Oct. 20, 2010, which claims priority to European Application No. 1018877.4, filed Oct. 25, 2010.

BACKGROUND OF THE INVENTION

Field of the Invention

The invention relates to a multilayer structure comprising a base layer comprising at least one transparent thermoplastic and a specific inorganic infra-red absorber as well as an IR-reflecting multi-ply layer, the production of such a multilayer structure and the use thereof for the production of glazing made of plastic in buildings, automobiles, rail vehicles and aircraft.

Description of Related Art

Glazing produced from compositions comprising transparent thermoplastic polymers, such as e.g. polycarbonate, offers many advantages over conventional glazing of glass for the vehicle sector and for buildings. These include e.g. increased fracture-proof properties or saving in weight, which in the case of automobile glazing makes possible a higher safety of passengers in the event of traffic accidents and lower fuel consumption. Finally, transparent materials which comprise transparent thermoplastic polymers allow a considerably greater freedom of design due to the simpler formability.

A disadvantage is, however, that the high thermal transmission (i.e. transparency to IR radiation) of transparent thermoplastic polymers in sunlight leads to an undesirable heating inside vehicles and buildings. The increased temperatures in the inside reduce the comfort for the passengers or occupants and can result in increased demands on the air-conditioning, which in turn increase energy consumption and in this way cancel out the positive effects again. In order nevertheless to take into account the requirement of a low energy consumption combined with a high passenger or occupant comfort, panes which are equipped with appropriate heat protection are necessary.

As has been known for a long time, the majority of solar energy falls to the range of the near infra-red (NIR) between 750 nm and 2500 nm, in addition to the visible range of light between 400 nm and 750 nm. Penetrating solar radiation e.g. is absorbed inside an automobile and emitted as long wavelength thermal radiation having a wavelength of from 5 μm to 15 μm. Since in this range conventional glazing materials—in particular thermoplastic polymers which are transparent in the visible range—are not transparent, the thermal radiation cannot radiate outwards. A greenhouse effect is obtained and the interior heats up. In order to keep this effect as low as possible, the transmission of the glazing in the NIR should therefore be minimized as far as possible. Conventional transparent thermoplastic polymers, such as e.g. polycarbonate, however, are transparent both in the visible range and in the NIR.

Additives which have the lowest possible transparency in the NIR without adversely influencing the transparency in the visible range of the spectrum e.g. are therefore required.

In order to impart to the plastics heat-absorbing properties, corresponding infra-red absorbers (IR absorbers) are therefore employed as additives. In particular, IR absorber systems which have a broad absorption spectrum in the NIR range with a simultaneously low absorption in the visible range (low intrinsic colour) are of interest for this. The corresponding plastics compositions should moreover have a high heat stability and an excellent light stability.

A large number of IR absorbers based on organic or inorganic materials which can be employed in transparent thermoplastics are known. A selection of such materials is described e.g. in J. Fabian, H. Nakazumi, H. Matsuoka, Chem. Rev. 92, 1197 (1992), in U.S. Pat. No. 5,712,332 or JP-A 06240146.

Nevertheless, IR-absorbing additives based on organic materials often have the disadvantage that they have a low stability towards exposure to heat or irradiation. Thus, many of these additives are not sufficiently stable to heat to be able to be incorporated into transparent thermoplastics, since temperatures up to 330° C. are required during processing of the plastics. Furthermore, the glazing is often exposed to temperatures of more than 50° C. over relatively long periods of time during use, due to the solar irradiation, which can lead to decomposition or to degradation of the organic absorbents. Furthermore, the organic IR absorbers often do not have sufficiently broad absorption bands in the NIR region, so that their use as IR absorbers in glazing materials is inefficient. An undesirable, intense intrinsic colour of these systems often also additionally occurs.

IR-absorbing additives based on inorganic materials are often significantly more stable compared with organic additives. The use of these systems is also often more economical, since in most cases they have a significantly more favourable price/performance ratio. Thus, materials based on finely divided borides, such as e.g. lanthanum hexaboride, have proved to be efficient IR absorbers, since they have a broad absorption band combined with a high heat stability. Such borides based on La, Ce, Pr, Nd, Tb, Dy, Ho, Y, Sm, Eu, Er, Tm, Yb, Lu, Sr, Ti, Zr, Hf, V, Ta, Cr, Mo, W and Ca are described e.g. in DE-A 10 392 543 or EP-A 1 559 743.

However, their significant intrinsic colour is a disadvantage of these additives. After incorporation, the boride-containing additives impart to the transparent plastic a characteristic green coloration, which is often undesirable since it severely limits the margin for imparting a neutral colour.

For example, DE-A 10 392 543, US-A 2004/0028920, EP-A 1 559 743, EP-A 1 865 027 and EP-A 2 009 057 describe polymer compositions based on inorganic boride particles. However, these compositions have the undesirable, significant intrinsic colour mentioned.

EP-A 1 559 743 describes polycarbonate compositions comprising inorganic IR absorbers based on borides in combination with UV absorbers. However, these compositions do not meet the high requirements with respect to a low energy transmission, in particular a low secondary energy transmission. Furthermore, these compositions have a significant intrinsic colour.

To compensate this intrinsic colour, relatively large amounts of further, preferably complementary colouring agents are often employed, but this impairs the optical properties of the composition and leads to a significantly reduced transmission in the visible range. This is undesirable especially in vehicle glazing, or is inadmissible in specific cases where the vision of the driver must not be impaired.

IR-absorbing additives from the group of tungsten compounds which have a lower intrinsic absorption in the visible spectral range compared with the inorganic boride-based IR absorbers known from the prior art are furthermore known.

The preparation and the use of these substances in thermoplastic materials is described, for example, in H. Takeda, K. Adachi, J. Am. Ceram. Soc. 90, 4059-4061, (2007), WO-A 2005/037932 and WO-A 2009/059901. However, the lack of long-term stability to exposure to heat has proved to be a disadvantage. While the instability of tungsten oxides to heat is known per se and has been described, for example, in Romanyuk et al.; J. Phys. Chem. C 2008, 112, 11090-11092, it has been found that when these compounds are incorporated into a polymer matrix, the absorption in the IR range also decreases significantly during thermal storage of the corresponding polymer compositions, such as e.g. in a polycarbonate composition, at elevated temperature.

For use in the glazing sector, in particular for automobile glazing, however, it is absolutely essential that the corresponding IR-absorbing plastics compositions have a long-term stability to higher temperatures, in particular those temperatures which an article of plastic can assume under intensive solar irradiation (e.g. 50° C.-110° C.). It must furthermore be ensured that the composition can be processed under conventional process conditions, without the IR-absorbing properties already being reduced as a result.

A further disadvantage of glazing containing IR absorbers is its storage of heat. A pane containing an IR absorber heats up when irradiated with sunlight and the heat stored is thereby afterwards released partly again to the outside, but partly also into the inside of the vehicle or building. This secondary heat transfer into the inside is critical, because this heats up the inside in addition to the direct energy transmission. In order also to take into account the secondary heat transfer, the so-called "total solar energy transmitted to the inside of a glazing", in the following also "total solar transmittance" $T_{TS}$ according to ISO 13837, is often stated for the performance of a system. A system with the highest possible transmission (Ty) in the visible range having a low primary and secondary energy transmission ($T_{TS}$) is often aimed for.

To avoid the indirect heating up by the secondary heat transfer, pigments or coatings which reflect the infra-red radiation are known. As a result of this reflection, the pane heats up less and the secondary heat transfer to the inside is lower. However, such systems often have a transmission which is too low for panes. These panes are often only translucent. Other disadvantages can lie e.g. in the shielding from radio waves and can thus impair the function of mobile communications and navigation equipment.

U.S. Pat. Nos. 6,333,084 and 5,589,280 disclose e.g. multilayer structures which comprise, inter alia, IR-reflecting thin layers of metal. However, these systems impede the passage of radio waves and therefore interfere with, inter alia, navigation or mobile communications equipment. Furthermore, thin layers of metal may be susceptible to corrosion.

DE-A 10 117 786 describes multilayer structures of a base layer comprising organic IR absorbers and an IR reflection layer. Merely the organic IR absorbers alone, however, have the above-mentioned stability problems.

US-A 2006/0251996 discloses multilayer sheets comprising a core layer comprising a thermoplastic polymer and a metal oxide as an IR-absorbing additive. These systems also do not meet the high requirements with respect to a low energy transmission, in particular a low secondary energy transmission. WO-A 99/36257 and US-A 2004/0032658 disclose multilayer systems which have IR-reflecting properties. However, these systems do not meet the high requirements with respect to an extremely low energy transmission combined with a high visual light transmission.

US 2008/0292820 A1 describes a multilayer film which comprises nanoparticles based on metal oxides, such as indium tin oxide (ITO) and/or antimony oxide (ATO), and IR absorbers, such as lanthanum hexaboride. Due to the small thickness of the IR-absorbing layer, the multilayer structure nevertheless has the disadvantage that different depths of colour may occur in the outer and inner regions of the film.

US 2008/0075948 A1 describes a multilayer structure consisting, inter alia, of an IR-reflecting layer and an IR-absorbing layer. Due to the structure of the multilayer body and the IR absorbers used, no uniform colour flow over the entire region of the film is to be expected.

WO 2004/000549 A1 describes a multilayer body of laminated glass. The structure comprises, inter alia, an IR-reflecting layer and an IR-absorbing layer. Here also, due to the small thickness of the IR-absorbing layer and the IR absorber used, no uniform colour flow is to be expected.

The combination of multi-ply layers with an adjacent layer containing IR absorber is described by way of example in US-A 2008/0291541 and US-A 2006/0154049. The layer containing IR absorber is preferably a thin coating of a maximum of 50 μm. Disadvantages of the structure described are the high intrinsic colour of the absorber layer and accompanying very low light transmission in the visible wavelength range. The thin layers containing IR absorber furthermore have a colour flow, since slight deviations in the thickness severely impair the colour.

There therefore continued to be a need for a multilayer structure of plastic which has a high transmission (Ty) in the visible range and a low primary and secondary energy transmission ($T_{TS}$), without the above-mentioned disadvantages occurring.

SUMMARY

The object of the present invention was accordingly to discover a plastics-based multilayer structure which has a high transmission (Ty) in the visible range and a low primary and secondary energy transmission (low $T_{TS}$ value). The structure should have as far as possible a low intrinsic colour, a high heat stability both at the processing temperatures of the plastics and during long-term use in glazing, and a high stability to permanent incident light. The systems furthermore should not impair mobile communications systems and navigation equipment, i.e. should have the highest possible transparency to radio waves. These multilayer structures are to be suitable for long-life use in glazing elements for building or vehicle glazing, i.e. have a corresponding long life with respect to light and heat stability. An economically acceptable price/performance ratio is also of interest for such fields of use.

It has been possible to achieve this object, surprisingly, by a multilayer structure comprising at least one transparent plastics base layer comprising at least 0.030 wt. % of nanoparticles based on indium tin oxide (ITO) and/or antimony-doped tin oxide, based on the total weight of the plastics composition for the base layer, as an IR absorber, and at least one multi-ply layer which reflects IR radiation and which has different plastics and different refractive indices in the layers directly adjacent to one another.

The present invention accordingly provides a multilayer structure, characterized in that it comprises
at least one base layer comprising at least one transparent thermoplastic and at least 0.038 wt. % to 0.5 wt. % of nanoparticles based on indium tin oxide (ITO) and/or antimony-doped tin oxide (ATO), based on the total weight of the plastics composition for the base layer, as an IR absorber, wherein the base layer does not comprise lanthanum hexaboride as a possible further IR absorber, and at least one multi-ply layer which reflects IR radiation and has different plastics and different refractive indices in the layers directly adjacent to one another.

DETAILED DESCRIPTION OF A PREFERRED EMBODIMENT

Surprisingly, compared with the systems known from the prior art, the multilayer structure according to the invention has a low $T_{TS}$ value and a lower intrinsic absorption in the visible spectral range, which results in a weaker intrinsic colour. Preferably, the multilayer structure according to the invention has a transmission of more than 70% in the visible wavelength range, combined with a $T_{TS}$ value of less than 60%, preferably less than 58%, particularly preferably of less than 56%. The intrinsic colour of the multilayer structure according to the invention corresponds to a neutral grey having an a* value of a*=0±5 and b*=0±5, preferably a*=0±4 and b*=0±4 (determination of the colour in accordance with ASTM E1348 with the weighting factors and formulae described in ASTM E308; the CIELAB colour coordinates L*, a*, b* are calculated for light type D 65 and 10° normal observer).

The multilayer structure according to the invention offers the advantage that the IR reflection properties are to the greatest extent supplemented synergistically by the IR absorption properties, i.e. the IR absorbers have a high absorbing power in a wavelength range in which the IR reflecting power of the IR reflection layer is only low or scarcely present, and conversely the IR reflection layer has a particularly high IR reflecting power in a wavelength range in which the absorbing power of the IR absorber is low. Preferably, the multilayer structures according to the invention have only small wavelength ranges, preferably ranges which comprise 100 nm or less, in which both a high reflecting power of more than 30% and a significant absorbing power, i.e. an IR transmittance of less than 20% in the base layer, exists. The inorganic IR absorbers employed according to the invention moreover have a good price/performance ratio.

The base layer preferably has a layer thickness of at least 500 μm, preferably of at least 1 mm, particularly preferably of at least 2 mm, very particularly preferably of at least 3 mm. No particular limits are set with respect to the maximum layer thickness. Preferably, layer thickness of up to 2 cm, particularly preferably of up to 8 mm, very preferably of up to 7 mm are conventional for certain uses. In certain uses, in particular for rail vehicles and aircraft, the thickness of the base layer can be, in particular, more than 8 mm, preferably 9 mm to 20 mm, the amount of the corresponding IR absorbers and optionally stabilizers being adapted here accordingly.

The antimony-doped tin oxide (ATO) employed is, in particular, one of the type $SnO_2$:Sb, i.e. tin(IV) oxide doped with antimony. Such ATO is commercially obtainable.

The indium tin oxide (ITO) employed is, in particular, a mixed oxide of indium(III) oxide and tin(IV) oxide, preferably one having 90 mol % of indium(III) oxide ($In_2O_3$) and 10 mol % of tin(IV) oxide ($SnO_2$). Such an ITO is commercially obtainable.

The base layer comprises the nanoparticles based on indium tin oxide (ITO) and/or antimony-doped tin oxide in an amount of from 0.038 to 0.500 wt. %, preferably from 0.050 to 0.250 wt. %, particularly preferably from 0.063 to 0.150 wt. %, based on the total weight of the plastics composition for the base layer.

The average particle diameter of the nanoparticles based on ATO or ITO to be employed according to the invention is preferably less than 200 nm, particularly preferably less than 100 nm and very particularly preferably less than 50 nm. In a particularly preferred embodiment, the average particle diameter is between 1 nm and 50 nm.

The average particle diameter can be determined with the aid of transmission electron microscopy (TEM) and represents the arithmetic mean of the particle sizes thereby determined.

The ITO and/or ATO particles are transparent to radiation in the visible wavelength range of the spectrum, transparent meaning that the absorption of these IR absorbers in the visible range of light is low compared with the absorption in the IR range and the IR absorber leads to no significantly increased clouding or significant reduction in transmission (in the visible range of light) of the composition or the particular end product.

In a further embodiment, in addition to the ATO- and/or ITO-based nanoparticles according to the invention, further IR absorbers can optionally additionally be employed in the thermoplastic composition, the total amount thereof in such a composition, however, in each case being below the amount of the ATO- and/or ITO-based nanoparticles. Preferably—all amounts contents of the additional IR absorbers taken together—less than 0.03 wt. %, based on the total weight of the plastics composition for the base layer, of additional IR absorbers is employed, based on the total weight of the plastics composition. If additional IR absorbers are employed, preferably—including ITO and/or ATO as IR absorbers—in total two to five, particularly preferably two or three different IR absorbers are employed.

The base layer comprises no lanthanum hexaboride ($LaB_6$). Preferably, no further metal borides are employed as additional inorganic IR absorbers. In a particularly preferred embodiment of the present invention, the base layer therefore comprises no metal borides.

The composition of the base layer can optionally comprise at least one further IR absorber based on tungstate, preferably caesium tungstate.

Suitable additional organic IR absorbers are described according to substance classes e.g. in M. Matsuoka, Infrared Absorbing Dyes, Plenum Press, New York, 1990. IR absorbers from the classes of phthalocyanines, naphthalocyanines, metal complexes, azo dyestuffs, anthraquinones, quadratic acid derivatives, immonium dyestuffs, perylenes, quaterrylenes and polymethines are particularly suitable. Of these, phthalocyanines and naphthalocyanines are very particularly suitable.

The composition of the base layer can optionally comprise at least one further IR absorber based on quaterrylene.

Combinations of the above-mentioned infra-red absorbers are particularly suitable, since by a targeted choice the person skilled in the art can achieve an optimization of the absorption in the near infra-red range.

In a preferred embodiment, the base layer can furthermore comprise at least one ultraviolet absorber. Ultraviolet absorbers which are suitable for use in the plastics composition for the base layer are compounds which have the lowest possible transmission below 400 nm and the highest possible transmission above 400 nm. Such compounds and the preparation thereof are known from the literature and are described, for example, in EP-A 0 839 623, WO-A 96/15102 and EP-A 0 500 496. UV absorbers which are particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxyphenyl)-benzotriazole (Tinuvin® 234, Ciba Spezialitätenchemie, Basel), 2-(2'-hydroxy-5'-(tert-octyl)-phenyl)-benzotriazole (Tinuvin® 329, Ciba Spezialitätenchemie, Basel), 2-(2'-hydroxy-3'-(2-butyl)-5'-(tert-butyl)-phenyl)-benzotriazole (Tinuvin® 350, Ciba Spezialitätenchemie, Basel), bis-(3-(2H-benzotriazolyl)-2-hydroxy-5-tert-octyl)methane (Tinuvin® 360, Ciba Spezialitätenchemie, Basel), (2-(4,6-diphenyl-1,3,5-triazin-2-yl)-5-(hexyloxy)-phenol (Tinuvin® 1577, Ciba Spezialitätenchemie, Basel), and the benzophenones 2,4-dihydroxybenzophenone (Chimassorb® 22, Ciba Spezialitätenchemie, Basel) and 2-hydroxy-4-(octyloxy)-benzophenone (Chimassorb® 81, Ciba, Basel), 2-propenoic acid, 2-cyano-3,3-diphenyl-, 2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetraethyl 2,2'-(1,4-phenylenedimethylidene)-bismalonate (Hostavin® B-Cap, Clariant AG).

Mixtures of these ultraviolet absorbers can also be employed.

There are no particular limitations with respect to the amount of the ultraviolet absorber contained in the plastics composition for the base layer, as long as the desired absorption of UV radiation and an adequate transparency of the shaped body produced from the composition are ensured. Preferably, the plastics composition for the base layer comprises UV absorbers in a total amount of from 0.05 wt. % to 20.00 wt. %, in particular from 0.07 wt. % to 10.00 wt. % and very particularly preferably from 0.10 wt. % to 1.00 wt. %, based on the total weight of the plastics composition for the base layer.

The base layer furthermore can additionally comprise at least one further stabilizer. These can be, for example and preferably, heat stabilizers, long-term stabilizers and/or stabilizers for the processing process, those stabilizers or mixtures of stabilizers which cover several of these properties being preferred in particular. Phosphorus-based stabilizers or phenolic-based stabilizers are preferred. Suitable additional stabilizers are phosphines, phosphites or phenolic antioxidants or mixtures thereof, since these can be employed in combination with the IR absorbers without adverse effects on the stability of these. Commercially obtainable suitable and preferred stabilizers are, for example, triphenylphosphine, Irgafos® 168 (tris(2,4-di-tert-butylphenyl)phosphite) and Irganox® 1076 (2,6-di-tert-butyl-4-(octadecanoxycarbonylethyl)-phenol), in each case individually or in combination.

In one embodiment of the invention, the combination of IR absorbers based on ATO and/or ITO and triphenylphosphine as a stabilizer is preferred. In a further embodiment of the invention, the combination of IR absorbers based on ATO and/or ITO and triphenylphosphine as well as Irgafos® 168 (tris(2,4-di-tert-butylphenyl)phosphite) as stabilizers is preferred. In a further embodiment of the invention, the combination of IR absorbers based on ATO and/or ITO and triphenylphosphine as well as Irgafos® 168 (tris(2,4-di-tert-butylphenyl)phosphite) with Irganox® 1076 (2,6-di-tert-butyl-4-(octadecanoxycarbonylethyl)phenol) or Irganox 1010 (pentaerythritol 3-(4-hydroxy-3,5-di-tert-butylphenyl) propionate; CAS: 6683-19-8) as stabilizers is preferred.

The amount of phosphines optionally employed is preferably 0.01 to 0.20 wt. %, based on the total weight of the plastics composition for the base layer. The amount of phosphites optionally employed is preferably 0.20 wt. %-0.01 wt. %, particularly preferably 0.10 wt. %-0.02 wt. %, based on the total weight of the plastics composition for the base layer. The amount of phenolic antioxidants optionally employed is preferably 0.100 wt. %-0.001 wt. %, particularly preferably 0.050 wt. % -0.005 wt. %, based on the total weight of the plastics composition for the base layer.

Suitable transparent thermoplastics for the base layer in the context of the invention are e.g. polymers of ethylenically unsaturated monomers and/or polycondensates of bifunctional reactive compounds. Examples of transparent thermoplastic polymers are polycarbonates or copolycarbonates based on diphenols, poly- or copolyester carbonates, poly- or copolyacrylates and poly- or copolymethacrylates, such as e.g. poly- or copolymethyl methacrylates, such as e.g. PMMA, and copolymers with styrene, such as e.g. transparent polystyrene/acrylonitrile (PSAN), or poly- or copolymers based on ethylene and/or propylene and aromatic poly- or copolyesters, such as poly- or copolyethylene terephthalate (PET), poly- or copolyethylene naphthalate (PEN), poly- or copolybutylene terephthalate (PBT) or glycol-modified PET (PETG), and transparent thermoplastic polyurethanes. Poly- or copolymers based on cyclic olefins (e.g. TOPAS™, a commercial product from Ticona), poly- or copolycondensates of terephthalic acid, such as e.g. poly- or copolyethylene terephthalates (PET or CoPET) or PETG can furthermore also be mixed in. Mixtures of several transparent thermoplastic polymers are also possible.

Preferred transparent thermoplastics are polymethyl methacrylate, aromatic polyesters, polycarbonates or copolycarbonates, polycarbonates or copolycarbonates being particularly preferred.

Particularly preferred poly- or copolycarbonates are the homopolycarbonate based on 2,2-bis-(4-hydroxyphenyl)-propane (bisphenol A), the homopolycarbonate based on 1,3-bis-(4-hydroxyphenyl)-3,3,5-trimethylcyclohexane and the copolycarbonates based on the two monomers 2,2-bis-(4-hydroxyphenyl)-propane (bisphenol A) and 1,1-bis-(4-hydroxyphenyl)-3,3,5-trimethylcyclohexane.

In the following, both homopolycarbonates and copolycarbonates together are called polycarbonates. The polycarbonates can be linear or branched in a known manner.

The preparation of the polycarbonates is carried out in a known manner from diphenols, carbonic acid derivatives, optionally chain terminators and branching agents. The polycarbonates according to the invention can be prepared by any known process, e.g. by the interfacial process or by the melt transesterification process, but polycarbonates from the interfacial process are preferred. Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Diphenols which are suitable for the preparation of the polycarbonates are, for example, hydroquinone, resorcinol, dihydroxydiphenyls, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl) sulfones, bis-(hydroxyphenyl) sulfoxides, alpha,alpha'-bis-(hydroxyphenyl)-diisopropyl-benzenes, phthalimidines derived from derivatives of isatin or of phenolphthalein, and nucleus-alkylated and nucleus-halogenated compounds thereof.

Preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

In the case of homopolycarbonates, only one diphenol is employed, and in the case of copolycarbonates several diphenols are employed.

Suitable carbonic acid derivatives are, for example, phosgene or diaryl compounds chosen from the group of diphenyl carbonate, 4-tert-butylphenyl phenyl carbonate, di-(4-tert-butylphenyl)carbonate, biphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl]carbonate and di-(methyl salicylate)carbonate.

Particularly preferred carbonic acid derivatives are phosgene or diphenyl carbonate. Suitable chain terminators which can be employed in the preparation of the polycarbonates are both monophenols and monocarboxylic acids. Suitable monophenols are phenol itself, alkylphenols, such as cresols, p-tert-butylphenol, cumylphenol, p-n-octylphenol, p-iso-octylphenol, p-n-nonylphenol and p-iso-nonylphenol, halophenols, such as p-chlorophenol, 2,4-dichlorophenol, p-bromophenol and 2,4,6-tribromophenol, 2,4,6-triiodophenol, p-iodophenol, and mixtures thereof Preferred monophenols are phenol, cumylphenol and/or p-tert-butylphenol.

Suitable monocarboxylic acids are furthermore benzoic acid, alkylbenzoic acids and halobenzoic acids.

Preferred chain terminators are furthermore the phenols which are substituted once or several times by $C_1$ to $C_{30}$-alkyl radicals, linear or branched, preferably unsubstituted or substituted by tert-butyl.

The amount of chain terminator to be employed is preferably 0.1 to 5 mol %, based on the substance amount of the particular diphenols employed.

Suitable branching agents are the tri- or more than trifunctional compounds known in polycarbonate chemistry, in particular those having three or more than three phenolic OH groups. Suitable branching agents are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-ortho-terephthalic acid ester, tetra-(4-hydroxyphenyl)-methane, tetra-(4-(4-hydroxyphenyl-isopropyl)-phenoxy)-methane and 1,4-bis-((4', 4''-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole. Particularly preferred branching agents are 3,3-bis-(3-methyl-4-hydroxyphenyl)-2-oxo-2,3-dihydroindole and 1,1,1-tri-(4-hydroxyphenyl)-ethane.

The amount of branching agents optionally to be employed is preferably 0.05 mol % to 2.00 mol %, based in turn on the substance amount of the particular diphenols employed.

The aromatic polycarbonates of the present invention have weight-average molecular weights $M_w$ (determined by gel permeation chromatography and calibration with polycarbonate calibration) of between 5,000 and 200,000, preferably between 10,000 and 80,000 and particularly preferably between 15,000 and 40,000 (this approximately corresponds to between 12,000 and 330,000, preferably between 20,000 and 135,000 and particularly preferably between 28,000 and 69,000, determined by gel permeation chromatography and calibration by means of a polystyrene standard).

The plastics compositions for the base layer can furthermore optionally also comprise further conventional polymer additives, such as e.g. the flameproofing agents, optical brighteners, colouring agents, pigments, flow improvers or processing auxiliaries, such as e.g. mould release agents, described in EP-A 0 839 623, WO-A 96/15102, EP-A 0 500 496 or "Plastics Additives Handbook", Hans Zweifel, 5th edition 2000, Hanser Verlag, Munich, in the conventional amounts for the particular thermoplastics.

Preferably, the further polymer additives are employed in amounts of from 0 wt. % up to 5 wt. %, preferably 0.1 wt. % to 1 wt. %, in each case based on the amount of the particular polymer total compositions. Mixtures of several additives are also suitable.

Suitable colouring agents or pigments are, for example, sulfur-containing pigments, such as cadmium red and cadmium yellow, pigments based on iron cyanide, such as Berlin blue, oxide pigments, such as titanium dioxide, zinc oxide, red iron oxide, black iron oxide, chromium oxide, titanium yellow, zinc-iron based brown, titanium-cobalt based green, cobalt blue, copper-chromium based black and copper-iron based black or chromium-based pigments, such as chromium yellow, phthalocyanine-derived dyestuffs, such as copper phthalocyanine blue and copper phthalocyanine green, condensed polycyclic dyestuffs and pigments, such as azo-based (e.g. nickel azo yellow), sulfur-indigo dyestuffs, perynone-based, perylene-based, quinacridone-derived, dioxazine-based, isoindolinone-based and quinophthalone-derived derivatives, anthraquinone-based or heterocyclic systems.

Concrete examples of commercial products are e.g. MACROLEX® Blau RR, MACROLEX® Violett 3R, MACROLEX® Violett B (Lanxess AG, Germany), Sumiplast® Violett RR, Sumiplast® Violett B, Sumiplast® Blau OR (Sumitomo Chemical Co., Ltd.), Diaresin® Violett D, Diaresin® Blau G, Diaresin® Blau N (Mitsubishi Chemical Corporation), Heliogen® Blau or Heliogen® Grün (BASF AG, Germany)

Of these, cyanine derivatives, quinoline derivatives, anthraquinone derivatives and phthalocyanine derivatives are particularly preferred.

Particularly suitable mould release agents for the compositions according to the invention are e.g. pentaerythritol tetrastearate (PETS) or glycerol monostearate (GMS).

Preferably, the multi-ply layer which reflects IR radiation can be a multilayer optical interference film. Such interference films can preferably be produced by coextrusion of alternating polymer layers. Such interference films can preferably be produced as a separate interference film by means of coextrusion. They are distinguished by narrow reflection ranges as a result of light interference.

The multi-ply layer which reflects IR radiation is preferably built up from several layers of transparent thermoplastics arranged parallel one above the other, for which the thermoplastics mentioned above for the base layer are possible. Aromatic poly- or copolyesters, such as e.g. poly- or copolyethylene terephthalate (PET), poly- or copolyethylene naphthalate (PEN), poly- or copolybutylene terephthalate (PBT) or glycol-modified PET (PETG), or poly- or copolyacrylates and poly- or copolymethacrylates, such as e.g. poly- or copolymethyl methacrylates, such as e.g. PMMA, are suitable here in particular. The particular layers directly adjacent to one another are preferably made of different thermoplastics. The refractive indices of the particular layers directly adjacent to one another preferably differ from one another at least by 0.03, particularly preferably by at least 0.06. Such a multi-ply layer which reflects IR radiation preferably comprises at least 10 layers. Preferably, this layer is an alternating structure in which layers of two different thermoplastics and having different refractive indices alternate. A layer structure in which layers of at least one aromatic poly- or copolyester and at least one poly- or copolyacrylate or poly- or copolymethacrylate alternate is particularly preferred in this context. This layer structure can optionally be provided with a protective layer on one side or on both sides for mechanical stabilizing. An aromatic poly- or copolyester, for example, is suitable and preferred for the plastics material of this protective layer.

The individual layers of the multi-ply layer which reflects IR radiation are preferably very thin having layer thicknesses in the range of from about 30 to 500 nm, preferably approximately 50 to 400 nm. The total layer thickness of the multi-ply film is preferably 10 to 500 µm, particularly preferably 15 to 250 µm and very particularly preferably 20 to 100 µm. An amplification interference from light waves reflected at the many boundary surfaces arises as a result. Depending on the layer thickness and the refractive index of the thermoplastics of the individual layers in the multi-ply layer, a prevailing wavelength band is reflected, while the remaining light is allowed through by the film. The amount of reflected light (reflecting power) depends on the difference between the refractive indices, in the case of the alternating structure on the difference between the two refractive indices, on the ratio of the optical thicknesses of the layers, on the number of layers and on the uniformity of the layer thicknesses.

Such multi-ply layers, in particular in the form of films, which reflects IR radiation are known to the person skilled in the art and are described, for example, in U.S. Pat. Nos. 3,610,729, 3,711,176, 4,446,305, 4,540,623, 5,448,404, 5,882,774, 6,531,230, 6,783,349, WO-A 99/39224 and WO-A 03/100521. They are furthermore commercially obtainable in the form of films.

In a preferred embodiment, the base layer has a low IR transmittance in the wavelength range of from 800 to 2300 nm, particularly preferably in the wavelength range of from 1200 to 2300 nm, very particularly preferably in the wavelength range of from 1400 to 2300 nm.

In a preferred embodiment, the IR transmittance in the wavelength range of from 1200 nm to 2300 nm is less than 20%, preferably less than 15%. Particularly preferably, the IR transmittance in the wavelength range of from 1400 nm to 2300 nm is less than 10%, particularly preferably less than 6%.

The IT transmittance is given by integration of the solar spectrum (solar spectrum according to ASTM G173-3) weighted with the transmission and standardized to the solar spectrum according to ASTM G173-3 for the particular wavelength range stated.

In a further preferred embodiment, the multi-ply layer reflects 30% of the IR radiation in the wavelength range of from 850 to 1800 nm, particularly preferably in the wavelength range of from 850 to 1500 nm (determined in accordance with ASTM D 1003). Particularly preferably, the multi-ply layer reflects 40% of the IR radiation in the wavelength range of from 800 to 1200 nm.

Preferably, the absorption properties of the base layer are adjusted such that with respect to the wavelength ranges in which they have a low IR transmittance (less than 20%) they do not overlap significantly with the reflection properties of the multi-ply layer, i.e. the wavelength ranges in which these reflect more than 40% of the IR radiation.

The multilayer structure according to the invention preferably has a scratch-resistant coating on at least one side, particularly preferably on both sides. This scratch-resistant coating can comprise additional UV absorbers. Two-layer systems are preferred as scratch-resistant coatings. A system in which the outermost layer of the two-layer system is a siloxane-based scratch-resistant coating, which very particularly preferably has additional UV absorbers, is particularly preferred.

The multilayer structures according to the invention have a low $T_{TS}$ value and a simultaneously high light transmission in the visible wavelength range. In addition, the multilayer structures according to the invention have a neutral intrinsic colour.

The multilayer structures according to the invention can be produced in a simple manner.

The present invention therefore also provides a process for the production of a multilayer structure according to the invention, characterized in that A) a plastics composition comprising at least one transparent thermoplastic, nanoparticles based on indium tin oxide (ITO) and/or antimony-doped tin oxide and optionally at least one UV absorber and/or at least one stabilizer is prepared, B) a substrate of plastic is produced by means of extrusion or injection moulding from the plastics composition obtained under A), C) a multi-ply film is applied using an adhesive and/or by means of lamination to the substrate of plastic obtained under B), D) at least one scratch-resistant coating is optionally applied to one or both outer sides of the product obtained under C).

The production of the plastics composition according to A) comprising at least one transparent thermoplastic, nanoparticles based on indium tin oxide (ITO) and/or antimony-doped tin oxide and optionally at least one UV absorber and/or at least one stabilizer and optionally further conventional polymer additives is carried out with the usual incorporation processes by bringing together, mixing and homogenizing the individual constituents, the homogenization in particular preferably taking place in the melt under the action of shear forces. The bringing together and mixing are optionally carried out before the melt homogenization, using powder premixes. Premixes which have been prepared from solutions of the mixing components in suitable solvents, homogenization optionally being carried out in solution and the solvent then being removed, can also be used.

In particular, the IR absorbers, heat stabilizers, UV absorbers and other additives of the composition according to the invention can be introduced here by known processes or as a masterbatch.

The use of masterbatches is preferred in particular for introduction of the IR absorber, masterbatches based on polycarbonate into which the IR absorbers . . . in the form of a ready-to-use IR absorber formulation comprising dispersing agent being used in particular. By using these masterbatches in combination with the corresponding IR absorber formulations, an agglomeration of the IR absorber in the polymer composition is effectively prevented.

The ITO and/or ATO nanoparticles can be employed as a pulverulent dispersion.

The inorganic ITO or ATO nanoparticles can be mixed with at least one dispersing agent and further organic solvents, such as e.g. toluene, benzene or other aromatic hydrocarbons, and ground in suitable mills, such as e.g. ball mills, with the addition of zirconium oxide (e.g. having a diameter of 0.3 mm) in order to produce the desired particle size distribution. The ITO or ATO nanoparticles are obtained in the form of a dispersion. After the grinding, further dispersing agents can optionally be added. The solvent is removed at elevated temperatures under reduced pressure.

For use in transparent thermoplastics, the ITO or ATO particles obtained in this way are preferably dispersed in an organic matrix, e.g. in a polymeric dispersing agent, and optionally ground as described above in a mill using suitable auxiliary substances, such as e.g. zirconium dioxide, and optionally using organic solvents, such as, for example, toluene, benzene or similar hydrocarbons, and the solvent or solvents is/are subsequently removed at elevated temperatures under reduced pressure.

Suitable dispersing agents are, above all, polymeric dispersing agents, preferably those dispersing agents which have a high light transmission. Possible such agents are, for example and preferably, polyacrylates, polyurethanes, polyethers, polyesters or polyester-urethanes.

Dispersing agents which are suitable for the present invention are commercially obtainable. Suitable polyacrylate-based dispersing agents are obtainable e.g. from Ciba Specialty Chemicals under the trade names EFKA®, e.g. EFKA® 4500 and EFKA® 4530. Polyester-containing dispersing agents are likewise suitable. They are obtainable, for example, from Avecia under the trade names Solsperse®, e.g. Solsperse® 22000, 24000SC, 26000, 27000. Polyether-containing dispersing agents are furthermore known e.g. under the trade names Disparlon® DA234 and DA325 of Kusumoto Chemicals. Polyurethane-based systems are also suitable. Polyurethane-based systems are obtainable from Ciba Specialty Chemicals under the trade name EFKA® 4046, EFKA® 4047. Texaphor® P60 and P63 are corresponding trade names of Cognis.

Preferred dispersing agents are polyacrylates, polyethers and polyester-based polymers, polyacrylates, such as e.g. polymethyl methacrylate or polymethyl acrylate (together called polymethyl (meth)acrylate) and polyester being particularly preferred as dispersing agents of high heat stability. Mixtures of these polymers or also copolymers based on acrylate can also be employed. Such dispersing auxiliaries and methods for the preparation of such ATO nanoparticle dispersions are described e.g. in JP-A 2009-235303 and DE-A 69 930 822. Dispersing agents based on polyacrylate are suitable in particular.

The amount of ITO or ATO nanoparticles in the dispersing agent is preferably 0.2 wt. % to 80.0 wt. %, particularly preferably 1.0 wt. % to 40.0 wt. %, very particularly preferably 5 wt. % to 35 wt. % and in very particularly preferred embodiments 10 wt. % to 30 wt. %, based on the total weight of the dispersion employed according to the invention comprising the ITO or ATO nanoparticles. The total composition of the ready-to-use IR absorber dispersion can also comprise, in addition to the IR absorber and the dispersing agent, further auxiliary substances, such as, for example, zirconium dioxide, and residual solvent, such as, for example, toluene, benzene or similar aromatic hydrocarbons.

The plastics composition for the base layer according to A) can be brought together, mixed, homogenized and then extruded in conventional devices, such as screw extruders (for example twin-screw extruders, TSE), kneaders or Brabender or Banbury mills. After the extrusion, the extrudate can be cooled and comminuted. Individual components can also be premixed and the remaining starting substances can then be added individually and/or likewise as a mixture.

The transparent thermoplastic plastics composition can be processed to give suitable substrates, for example in the form of sheets, films or shaped bodies. For this, the plastics composition according to A) can first be processed to granules as described and these granules can be processed by suitable processes in a known manner, e.g. by means of extrusion or injection moulding, to give various substrates. In this context, processing by means of extrusion also includes coextrusion.

In this connection, the substrate of plastic for the layer systems according to the invention can be converted, for example, by hot pressing, spinning, blow moulding, thermoforming, extrusion or injection moulding, into products or shaped bodies, shaped objects, such as toy parts, fibres, films, tapes, sheets, such as solid sheets, multi-wall sheets, twin-wall sheets or corrugated sheets, vessels, tubes or other profiles.

For extrusion, the plastics composition, which has optionally been pretreated, e.g. by means of drying, is fed to the extruder and melted in the plasticating system of the extruder. The plastics melt is then forced through a sheet die or a multi-wall sheet die and thereby formed, brought into the desired final shape in the nip of a polishing calender and fixed in shape by alternate cooling on polishing rolls and in the ambient air. The temperatures necessary for extrusion of the polymer composition are set, it usually being possible to follow the manufacturer's instructions. If the polymer compositions comprise, for example, polycarbonates of high melt viscosity, these are usually processed at melt temperatures of from 260° C. to 320° C., and the barrel temperatures of the plasticating barrel and the die temperatures are set accordingly.

By using one or more side extruders and a multichannel die or optionally suitable melt adapters before a sheet die, thermoplastic melts of different composition can be laid on top of one another and multi-layered sheets or films can be produced in this way, one of these layers being the base layer in the context of this invention (for the coextrusion see, for example, EP-A 0 110 221, EP-A 0 110 238 and EP-A 0 716 919, for details of the adapter and die process see Johannaber/Ast: "Kunststoff-Maschinenführer", Hanser Verlag, 2000 and in Gesellschaft Kunststofftechnik: "Coextrudierte Folien und Platten: Zukunftsperspektiven, Anforderungen, Anlagen und Herstellung, Qualitätssicherung", VDI-Verlag, 1990).

Shaped bodies can also be produced from the thermoplastic substrates described above by injection moulding. The processes for this are known to the person skilled in the art and are described in "Handbuch Spritzgießen", Friedrich Johannnaber/Walter Michaeli, Munich; Vienna: Hanser, 2001, ISBN 3-446-15632-1 or "Anleitung zum Bau von Spritzgiesswerkzeugen", Menges/Michaeli/Mohren, Munich; Vienna: Hanser, 1999, ISBN 3-446-21258-2.

In this process, using an injection moulding machine, the particular material, or the moulding composition, is plasticated in an injection unit and injected into an injection mould. The hollow space, the cavity, of the mould determines the shape and the surface structure of the finished component.

Injection moulding in the context of the invention includes all injection moulding processes, including multi-component injection moulding and injection-compression processes. The injection moulding and injection-compression variants known in plastics processing are employed for the production of mouldings of plastic.

Conventional injection moulding processes without the injection-compression technique are used in particular for the production of smaller injection moulded parts in which short flow paths occur and moderate injection pressures can be used. In conventional injection moulding processes, the plastics composition is injected into a cavity formed between two closed mould plates of fixed position and solidifies there.

Injection-compression processes differ from conventional injection moulding processes in that the injection and/or solidification operation is carried out while moving the mould plates. In the known injection-compression process, the mould plates are already opened somewhat before the injection operation, in order to compensate the shrinkage which occurs during the later solidification and to reduce the injection pressure required. A pre-enlarged cavity is therefore already present at the start of the injection operation. Flash faces of the mould still guarantee an adequate tightness of the pre-enlarged cavity even with the mould plates opened somewhat. The plastics composition is injected into this pre-enlarged cavity, and during this or thereafter is compressed while the mould is moved in the closing direction. For the production in particular of large-area and thin-walled mouldings with long flow paths, the more involved injection-compression technique is preferred, or possibly absolutely necessary. Only in this manner is a reduction in the injection pressures required for large mouldings achieved. Furthermore, stresses or distortion in the injection moulded part which occur as a result of high injection pressures can be avoided by injection-compression. This is important in particular for the production of plastics for optical uses, such as, for example, glazing (windows) in motor vehicles, since increased requirements of absence of stresses are to be adhered to in plastics for optical uses.

In this context, the IR absorbers based on ITO and/or ATO have a high heat stability at the processing temperatures of the plastics, so that their IR absorbing power is not impaired or is impaired only minimally, preferably not impaired, by the plastics processing.

The application of the multi-ply film to the substrate can be carried out using an adhesive and/or by means of lamination, it being possible for the application by means of lamination to be carried out both with assistance by an adhesive and with the complete absence of an adhesive. The multi-ply film can furthermore be insert moulded with corresponding materials of the thermoplastic base layer in order to produce a composite of the thermoplastic base layer and the multi-ply film.

In the case of application using an adhesive, the use of a latent reactive adhesive is very particularly preferred. Latent reactive adhesives are known to the person skilled in the art. Preferred latent reactive adhesives are those which comprise an aqueous dispersion and which comprise a di- or polyisocyanate with a melting or softening temperature of >30° C. and a polymer which is reactive with isocyanate. Preferably, such an aqueous dispersion has a viscosity of at least 2,000 mPas. Preferably, furthermore, the isocyanate-reactive polymer in this dispersion is a polyurethane which is built up from crystallizing polymer chains which, when measured by means of thermomechanical analysis (TMA), partly or completely decrystallize at temperatures below +110° C., preferably at temperatures below +90° C. The measurement by means of TMA is carried out analogously to ISO 11359 Part 3 "Determination of the penetration temperature". Preferably, furthermore, the di- or polyisocyanate is one chosen from the group consisting of dimerization products, trimerization products and urea derivatives of TDI (toluylene-diisocyanate) or IPDI (isophorone-diisocyanate). Such latent reactive adhesives are described, for example, in DE-A 10 2007 054 046.

In a particular embodiment, the multilayer structures according to the invention can be coated on one or both sides, preferably on both sides, with a scratch-resistant coating, which preferably comprises additional UV absorbers. This coating serves to protect the multilayer structure from mechanical impairment of the surface (e.g. scratching) and from general weathering influences (e.g. damage by UV radiation of sunlight) and thus increases the resistance of the correspondingly treated products.

Various methods for producing a scratch-resistant coating on articles of plastic are known. For example, epoxy-, acrylic-, polysiloxane-, colloidal silica gel- or inorganic/organic- (hybrid systems)-based lacquers can be used. These systems can be applied, for example, via dipping processes, spincoating, spray processes or flow coating. Curing can be carried out by means of heat or by means of UV irradiation. Single- or multi-layer systems can be used. The scratch-resistant coating can be applied e.g. directly or after preparation of the substrate surface with a primer. Furthermore, a scratch-resistant coating can be applied via plasma-assisted polymerization processes, e.g. via an $SiO_2$ plasma. Further coatings which are additionally possible, such as e.g. anti-fogging or other coatings, can likewise be produced via plasma processes. Various additives, such as e.g. UV absorbers derived e.g. from triazoles or triazines, can be present in the scratch-resistant layer. The scratch-resistant lacquer itself or the primer layer can comprise these additives. The thickness of the scratch resistance layer is preferably 1 µm to 20 µm, preferably 2 µm to 15 µm. Below 1 µm the resistance of inorganic scratch-resistant layers is usually inadequate. Above 20 µm there is the risk of cracking in the lacquer. After production, the multilayer structure according to the invention is preferably provided by means of extrusion or injection moulding with at least one such scratch-resistant layer described above.

For coating of polycarbonate-based surfaces, a primer comprising a UV absorber is preferably employed in order to improve the adhesion of the scratch-resistant lacquer. The primer can comprise further stabilizers, such as e.g. HALS systems (stabilizers based on sterically hindered amines), adhesion promoters, flow auxiliaries. The particular primer resin can be chosen from a large number of materials and is described e.g. in Ullmann's Encyclopedia of Industrial Chemistry, 5th edition, vol. A18, pp. 368-426, VCH, Weinheim 1991. Polyacrylates, polyurethanes, phenol-based, melamine-based, epoxy and alkyd systems or mixtures of these systems can be employed. The resin is usually dissolved in suitable solvents—often in alcohols. Depending on the resin chosen, curing can be carried out at room temperature or at elevated temperatures. Preferably, temperatures of between 50° C. and 130° C. are employed—often after a large proportion of the solvent has been briefly removed at room temperature. Commercially obtainable systems are e.g. SHP470, SHP470FT2050 and SHP401 from Momentive Performance Materials. Such coatings are described e.g. in U.S. Pat. No. 6,350,512 B1, U.S. Pat. No. 5,869,185, EP 1308084, WO 2006/108520.

Preferred scratch-resistant lacquers are built up from siloxanes and preferably comprise UV absorbers. They are preferably applied via dipping or flow processes. Curing is preferably carried out at temperatures of from 50° C. to 130° C. Commercially obtainable systems are e.g. AS4000, SHC5020 and AS4700 from Momentive Performance Materials. Such systems are described e.g. in U.S. Pat. No. 5,041,313, DE 3121385, U.S. Pat. No. 5,391,795, WO 2008/109072. The synthesis of these materials is usually carried out via condensation of alkoxy- and/or alkylalkoxysilanes under acid or base catalysis. Nanoparticles can optionally be incorporated. Preferred solvents are alcohols, such as butanol, isopropanol, methanol, ethanol, methoxypropanols and mixtures thereof.

Instead of primer/scratch-resistant coating combinations, one-component hybrid systems can be employed. These are described e.g. in EP-A 570 165, WO-A 2008/071363 or DE-A 28 04 283. Commercially obtainable hybrid systems are obtainable e.g. from Momentive Performance Materials under the names PHC587 or UVHC 3000.

The multilayer structures according to the invention are suitable in particular for the production of sheets, films, glazing, for example vehicle windows or roofs, such as e.g. automobile windows, automobile sunroofs, windows for trains or aircraft, panoramic roofs, roofing or building glazing, which comprise the multilayer structures according to the invention. In this context, twin-wall sheets or multi-wall sheets can also be used. As further components of the products according to the invention, in addition to the compositions according to the invention, the products according to the invention can comprise, for example, further material parts. For example, glazing can have sealing materials at the edge of the glazing. Roofing can have, for example, metal components, such as screws, metal pins or the like, which can serve for fixing or guiding (in the case of folding or sliding roofs) the roofing elements. Further materials can furthermore be combined with the compositions according to the invention, e.g. in 2-component injection moulding. Thus, the corresponding component with IR-absorbing properties can be provided with an edge which serves e.g. for gluing.

Since the multilayer structures according to the invention have a high heat stability both at the processing temperatures of the plastics and during long-term use in glazing, and a high stability against permanent incident light, their use for long-term use in glazing made of plastic in buildings, automobiles, rail vehicles and aircraft is particularly preferred.

The present invention furthermore accordingly provides the use of the multilayer structures according to the invention for glazing made of plastic in buildings, automobiles, rail vehicles and aircraft.

The present invention moreover furthermore provides glazing made of plastic in buildings, automobiles, rail vehicles and aircraft, comprising at least one multilayer structure according to the invention.

The following examples serve to explain the invention by way of example and are not to be interpreted as a limitation.

The invention is described in more detail in the following with the aid of embodiment examples, the determination methods described here being used for all the corresponding parameters in the present invention if nothing to the contrary has been described.

Determination of the Melt Volume Rate (MVR):

The melt volume rate (MVR) was determined in accordance with ISO 1133 (at 300° C.; 1.2 kg).

Determination of the Colour:

The colour in transmission is determined with a Lambda 900 spectrophotometer from Perkin Elmer with a photometer sphere in accordance with ASTM E1348 using the weighting factors and formulae described in ASTM E308.

The CIELAB colour coordinates L*, a*, b* are calculated for light type D 65 and 10° normal observer.

Light Transmission:

The light transmission was carried out on a Lambda 900 spectrophotometer from Perkin Elmer using a photometer sphere according to ISO 13468-2.

Determination of the $T_{DS}$ value (solar direct transmittance), the $R_{DS}$ value (solar direct reflectance) and the $T_{TS}$ value (solar total transmittance):

The transmission and reflection measurements were carried out on a Lambda 900 spectrophotometer from Perkin Elmer using a photometer sphere. All the values were determined at wavelengths of from 320 nm up to and including 2300 nm with $\Delta\lambda$ 5 nm.

The "solar direct transmittance" $T_{DS}$, the "solar direct reflectance" $R_{DS}$ and the "solar total transmittance" $T_{TS}$ were calculated in accordance with ISO 13837, computational convention "A". In this context, the calculation of the $T_{TS}$ values was performed in accordance with appendix B of ISO 13837. In this context, a vertical arrangement for a stationary vehicle (in accordance with appendix B.2 of ISO 13837) and the coefficients stated for single glass under "note 2" in appendix B.2 of ISO 13837 were assumed.

Determination of the Average Particle Size of the IR Absorber Nanoparticles Employed According to the Invention:

The determination of the particle size was carried out by means of transmission electron microscopy on a microscope of type designation EM 208 from FEI Company (5651 GG Eindhoven, The Netherlands). For this, the IR absorber dispersion (e.g. dispersion FMDS 874) was ground by means of an agate mortar and then prepared by means of ultrasound in ethanol on a copper support grid (for transmission electron spectroscopy). Photographs were produced in a 310,000-fold magnification. The particle size was determined by means of image analysis measurement methods in bright field contrast (evaluation of the particle size via grey value contrast).

The determination of the average particle size was carried out on the product FMDS 874 and gave the following result:
Number of objects evaluated: 217
Smallest measurement value: 3.0 nm
Largest measurement value: 20.1 nm
Arithmetic mean (average particle diameter): 7.80

Production of the Sample Sheets:

For production of the sample sheets, the additive-free polycarbonate Makrolon® 2608 (linear bisphenol A polycarbonate) from Bayer MaterialScience having a melt volume rate (MVR) of 12 cm³/10 min at 300° C. under a 1.2 kg load in accordance with ISO 1133 was used.

The compounding of the additives was carried out on a twin-screw extruder from KraussMaffei Berstorff type ZE25 at a housing temperature of 260° C. and a melt temperature of 270° C. at a speed of rotation of 100 rpm.

The granules were dried in vacuo at 120° C. for 3 hours and then processed on an injection moulding machine of the Arburg 370 type with a 25 injection unit at a melt temperature of 300° C. and a mould temperature of 90° C. to give sample sheets having the dimensions 60 mm×40 mm×4 mm.

A pulverulent dispersion (FMDS 874 from Sumitomo Metal Mining, Japan, polyacrylate dispersion) was employed as an IR absorber based on ATO, the solids content of $SnO_2$:Sb in the dispersion being 25 wt. %.

Lanthanum hexaboride, $LaB_6$ (KHDS 06 from Sumitomo Metal Mining, Japan), was employed as the IR absorber in the comparative examples. The product was in the form of a pulverulent dispersion in polyacrylate. The solids content of lanthanum hexaboride in the commercial KHDS 06 dispersion employed was 21.5 wt. %.

Triphenylphosphine (TPP, Sigma-Aldrich, 82018 Taufkirchen, Germany) was employed as the heat stabilizer.

TINUVIN® 329 (TIN 329 in the following) (2-(benzotriazol-2-yl)-4-(2,4,4-trimethylpentan-2-yl)phenol/CAS no. 3147-75-9) from BASF AG, Ludwigshafen was employed as the UV absorber.

Pentaerythritol tetrastearate (Cognis Oleochemicals GmbH, Düsseldorf) was employed as the mould release agent.

Multi-ply Film:

A commercially obtainable IR reflection film from 3M (SRF 1200) was used. This was a transparent, IR-reflecting film having less than 20% light transmission in the range of between 850 and 1100 nm (determined in accordance with ASTM D 1003).

Adhesive Coating and Application to the Multi-ply Film:

For lamination of the multi-ply film to the thermoplastic substrate (sample sheets), an adhesive layer was employed as an adhesion promoter. This was prepared from an adhesive dispersion which comprised the following components:

A) Polyurethane dispersion: Dispercoll® U 53

Polyurethane dispersion from Bayer MaterialScience AG, 51368 Leverkusen; solids content approx. 45 wt. %; isocyanate-reactive polymer of linear polyurethane chains.

B) Thickener: Borchi® Gel L 75 N

Non-ionic, liquid, aliphatic polyurethane-based thickener: viscosity at 23° C.: >9,000 mPas; non-volatile constituents: 50 wt. %.

C) Surface-deactivated polyisocyanate: Dispercoll® BL XP 2514

Suspension of surface-deactivated TDI uretdione (TDI dimer) in water having a solids content of approx. 40 wt. %.

For the preparation of the adhesive dispersion, 7 parts by weight of the thickener B) were first added to 700 parts by weight of the polyurethane dispersion A), while stirring, in order to increase the viscosity. 10 parts by weight of the surface-deactivated polyisocyanate C) were then added to 100 parts by weight of this thickened dispersion, while stirring, so that an aqueous dispersion was obtained.

The IR reflection film was then coated with this adhesive dispersion using a spiral doctor blade, the wet layer thickness of the adhesive dispersion being 100 μm, so that a dry layer thickness of approx. 30 μm was obtained. The coated film was then dried for 90 min at approx. 35° C. in a drying cabinet and was then ready for use in the lamination.

The lamination of the film on to the sample sheets was carried out by means of a lamination press from Bürkle with the following parameters:

Preheating of the press to 170-180° C.

Pressing for 8 minutes under a pressure of 5 N/cm²

Pressing for 2 minutes under a pressure of 200 N/cm²

Cooling of the press to 38° C. and opening of the press.

EXAMPLE 1 (COMPARATIVE EXAMPLE)

0.05% of triphenylphosphine was added to Makrolon® 2608 under the conditions described above and the mixture was compounded. After production of the sample sheets, a multi-ply film was laminated on as described above.

EXAMPLE 2 (COMPARATIVE EXAMPLE)

0.025 wt. % of ATO (weight content of ATO, based on the total weight of the plastics composition; corresponds to 0.1 wt. % of FMDS 874 dispersion comprising ATO) and 0.05% of triphenylphosphine were added to Makrolon® 2608 under the conditions described above and the mixture was compounded. After production of the sample sheets, a multi-ply film was laminated on as described above.

EXAMPLE 3 (COMPARATIVE EXAMPLE)

0.0022% of lanthanum hexaboride (weight content of $LaB_6$, based on the total weight of the plastics composition; corresponds to 0.01 wt. % of KHDS 06 dispersion comprising $LaB_6$) and 0.05% of triphenylphosphine were added to Makrolon® 2608 under the conditions described above and the mixture was compounded. After production of the sample sheets, a multi-ply film was laminated on as described above.

EXAMPLE 4 (COMPARATIVE EXAMPLE)

0.0065% of lanthanum hexaboride (weight content of $LaB_6$, based on the total weight of the plastics composition; corresponds to 0.03 wt. % of KHDS 06 dispersion comprising $LaB_6$) and 0.05% of triphenylphosphine were added to Makrolon® 2608 under the conditions described above and the mixture was compounded. After production of the sample sheets, a multi-ply film was laminated on as described above.

EXAMPLE 5 (ACCORDING TO THE INVENTION)

0.075% of ATO (weight content of ATO, based on the total weight of the plastics composition; corresponds to 0.3 wt. % of FMDS 874 dispersion comprising ATO) and 0.05% of triphenylphosphine were added to Makrolon® 2608 under the conditions described above and the mixture was compounded. After production of the sample sheets, a multi-ply film was laminated on as described above.

EXAMPLE 6 (ACCORDING TO THE INVENTION)

0.10% of ATO (weight content of ATO, based on the total weight of the plastics composition; corresponds to 0.4 wt. % of FMDS 874 dispersion comprising ATO) and 0.05% of triphenylphosphine were added to Makrolon® 2608 under the conditions described above and the mixture was compounded. After production of the sample sheets, a multi-ply film was laminated on as described above.

The results of the measurements of the $T_{TS}$, Ty, Re and colour values for Examples 1 to 6 are summarized in Tab. 1.

TABLE 1

| Example no. | $LaB_6$ [wt. %] | ATO [wt. %] | $T_{TS}$ [%] | Ty [%] | Re [%] | a* | b* |
|---|---|---|---|---|---|---|---|
| 1 | — | — | 65.9 | 87.5 | 30.3 | −0.42 | 2.45 |
| 2 | — | 0.025 | 61.7 | 82.9 | 27.5 | −0.89 | 2.73 |
| 3 | 0.0022 | — | 50.5 | 71.0 | 28.3 | −3.89 | 10.08 |
| 4 | 0.0065 | — | 36.2 | 47.2 | 26.0 | −8.01 | 20.99 |

TABLE 1-continued

| Example no. | LaB$_6$ [wt. %] | ATO [wt. %] | T$_{TS}$ [%] | Ty [%] | Re [%] | a* | b* |
|---|---|---|---|---|---|---|---|
| 5 | — | 0.075 | 55.3 | 75.7 | 27.1 | −1.69 | 2.82 |
| 6 | — | 0.10 | 52.6 | 71.6 | 27.0 | −2.00 | 3.25 |

Examples 5 and 6 according to the invention show that low total transmission values (T$_{TS}$<56%) and a simultaneously high transmission in the visible wavelength range (Ty) and a low intrinsic colour can be achieved for IR radiation by the layer structure according to the invention. These systems therefore have a high protection against thermal radiation, but without the visual transparency being impaired. In contrast, other systems according to the comparative examples either have too high total transmission values for IR radiation (cf. Examples 1 and 2; T$_{TS}$ value too high) or are intensely coloured (cf. Examples 3 and 4). Examples 3 and 6 are thus comparable from the point of view of their T$_{TS}$ and visual light transmission (Ty), but Example 3 has significantly higher colour values. Example 4 indeed shows a low T$_{TS}$ value, but neither the colour nor the light transmission is acceptable.

The invention claimed is:

1. A multilayer structure, wherein said multilayer structure comprises:
   at least one base layer comprising at least one transparent thermoplastic and 0.038 wt. % to 0.5 wt. % of nanoparticles based on indium tin oxide (ITO) and/or antimony-doped tin oxide, based on the total weight of plastics for the base layer, as an IR absorber, wherein the base layer does not comprise a metal boride as an IR absorber and wherein the layer thickness of said base layer is at least 500 nm, and
   at least one multi-ply layer which reflects IR radiation and has different plastics and different refractive indices in the layers directly adjacent to one another,
   wherein the transparent thermoplastic in the base layer is a polycarbonate or a copolycarbonate, and wherein the multilayer structure has an intrinsic color corresponding to a neutral grey having an a* value of a*=0±4 and b*=0±4, and wherein the multilayer structure has a transmission of more than 70% in the visible wavelength range and a T$_{TS}$ value of less than 60%.

2. The multilayer structure according to claim 1, wherein said multi-ply layer is a layer produced from an optical interference film.

3. The multilayer structure according to claim 1, wherein said multi-ply layer is one in which the refractive indices of the layers directly adjacent to one another differ from one another by at least 0.03.

4. The multilayer structure according to claim 1, wherein said multi-ply layer has at least 10 layers comprising different refractive indices.

5. The multilayer structure according to claim 1, wherein the individual layers of the multi-ply layer have a layer thickness of from 30 to 500 nm.

6. The multilayer structure according to claim 1, wherein said multilayer structure comprises nanoparticles based on indium tin oxide (ITO) and/or antimony-doped tin oxide in the base layer in an amount of from 0.063 to 0.15 wt. %, based on the total weight of plastics for the base layer.

7. The multilayer structure according to claim 1, wherein said nanoparticles based on indium tin oxide (ITO) and/or antimony-doped tin oxide have an average particle diameter of less than 200 nm.

8. The multilayer structure according to claim 1, wherein said multilayer structure comprise at least one scratch-resistant coating on a side of the base layer and/or on a side of the multi-ply layer.

9. The multilayer structure according to claim 8, wherein said base layer and/or the scratch-resistant coating comprise at least one UV absorber.

10. The multilayer structure according to claim 1, wherein said base layer has an IR transmittance of not more than 20% in the wavelength range of from 1200 to 2300 nm and the multi-ply layer reflects 30% of the IR radiation in the wavelength range of from 850 to 1800 nm.

11. A process for producing a multilayer structure according to claim 1, comprising:
   A) preparing a plastics composition comprising at least one transparent thermoplastic, nanoparticles based on indium tin oxide (ITO) and/or antimony-doped tin oxide,
   B) producing a substrate of plastic by extrusion or injection moulding from a composition obtained under A),
   C) applying a multi-ply film using an adhesive and/or by lamination to the substrate of plastic obtained under B).

12. The process according to claim 11, further comprising:
   D) applying at least one scratch-resistant coating to one or both outer sides of a product obtained under C).

13. A multilayer structure according to claim 1, which is capable of being used for producing glazing made of plastic in one or more of buildings, automobiles, rail vehicles and/or aircraft.

14. A glazing comprising plastic used in one or more of buildings, automobiles, rail vehicles and aircraft, said glazing comprising at least one multilayer structure according to claim 1.

15. The multilayer structure according to claim 1, wherein the individual layers of the multi-ply layer have a layer thickness of from 50 to 400 nm.

16. The multilayer structure according to claim 1, wherein said multilayer structure comprises nanoparticles based on indium tin oxide (ITO) and/or antimony-doped tin oxide in the base layer in an amount of from 0.050 to 0.250 wt. % based on the total weight of plastics for the base layer.

17. The multilayer structure according to claim 1, wherein said nanoparticles based on indium tin oxide (ITO) and/or antimony-doped tin oxide have an average particle diameter of less than 100 nm.

18. The multilayer structure according to claim 1, wherein said base layer has an IR transmittance of not more than 20% in the wavelength range of from 1400 to 2300 nm, and the multi-ply layer reflects 30% of the IR radiation in the wavelength range of from 850 to 1500 nm.

19. The multilayer structure according to claim 1, wherein the multilayer structure has a transmission of more than 70% in the visible wavelength range and a T$_{TS}$ value of less than 56%.

* * * * *